(12) United States Patent
De Santis et al.

(10) Patent No.: US 9,513,912 B2
(45) Date of Patent: Dec. 6, 2016

(54) MEMORY CONTROLLERS

(75) Inventors: Luca De Santis, Avezzano (IT);
Maria-Luisa Gallese, Avezzano (IT);
Emanuele Sirizotti, Avezzano (IT);
Walter Di-Francesco, Silvi (IT)

(73) Assignee: Micron Technology, Inc., Boise, ID (US)

( * ) Notice: Subject to any disclaimer, the term of this patent is extended or adjusted under 35 U.S.C. 154(b) by 876 days.

(21) Appl. No.: 13/560,279

(22) Filed: Jul. 27, 2012

(65) Prior Publication Data
US 2014/0032886 A1    Jan. 30, 2014

(51) Int. Cl.
| G06F 7/38 | (2006.01) |
| G06F 7/00 | (2006.01) |
| G06F 9/30 | (2006.01) |
| G06F 9/32 | (2006.01) |
| G06F 9/38 | (2006.01) |

(52) U.S. Cl.
CPC ....... *G06F 9/30145* (2013.01); *G06F 9/30185* (2013.01); *G06F 9/30189* (2013.01); *G06F 9/322* (2013.01); *G06F 9/3879* (2013.01)

(58) Field of Classification Search
CPC .......................... G06F 9/30181; G06F 9/3836
See application file for complete search history.

(56) References Cited

U.S. PATENT DOCUMENTS

| 5,848,026 A | 12/1998 | Ramamurthy et al. |
| 6,247,036 B1* | 6/2001 | Landers .................... G06F 7/49 708/603 |
| 7,467,286 B2 | 12/2008 | Abdallah et al. |
| 2003/0236965 A1* | 12/2003 | Sheaffer ........................ 712/209 |
| 2008/0122843 A1* | 5/2008 | Chung et al. ................. 345/426 |
| 2010/0205346 A1 | 8/2010 | Lundstrum et al. |
| 2011/0004742 A1 | 1/2011 | Hassan |
| 2011/0113167 A1 | 5/2011 | Lee et al. |
| 2014/0032886 A1* | 1/2014 | Santis ................. G06F 9/30145 712/229 |

* cited by examiner

*Primary Examiner* — Hyun Nam
(74) *Attorney, Agent, or Firm* — Dicke, Billig & Czaja, PLLC

(57) ABSTRACT

Methods and controllers for executing an instruction set are provided. In one such method, executing an instruction set includes executing an instruction of one type in the instruction set, executing a context switch instruction, and executing an instruction of a second type in the instruction set. in one such controller, a single machine executes instructions in an instruction set with instructions having an operational code, and instructions that do not have an operational code.

27 Claims, 7 Drawing Sheets

16 BIT INSTRUCTION SET 400

| | Mnemonics | Code | Register range | |
|---|---|---|---|---|
| | | CONTEXT 0 | | |
| | | *-Flow control* | | |
| | LONGAMP | 0000000101AAAAAA | | Sets base register for jumping over one memory page |
| 402 | AJMP | 000100AAAAAAAAAA | | Absolute jump |
| | CALL | 00100MAAAAAAAAAA | | Call a subroutine |
| | JMPZ | 00111NAAAAAAAAAA | | Jump if result of previous instruction is zero/not-zero |
| | CASE_AUX | 0000101UUUUUX0HH | | Jumps on value of an input register |
| | CASE_REG | 0000101RRRRRR1HH | | Jumps on value of a single bit register |
| | RET | 0000000100XXXXXX | | return from a subroutine |
| | HALT | 00000000111XXXXX | | stop running |
| | NOP | 0000000000000000 | | no operation |
| | UMP8 | 000001011HRRRRRR | 0-63 | jump on the value of an 8 bit register value |
| | UMP16 | 0000001111RRRRRR | 0-63 | jump on the value of an 16 bit register value |
| | SLEEPX8 | 0000000111RRRRRR | 0-63 | waits according to the value of an 8 bit register counting on it |
| | SLEEPX16 | 000001010HRRRRRR | 0-63 | waits according to the value of an 16 bit register counting on it |
| | | *-Register operations* | | |
| 404 | SET1 | 01010BHHHHRRRRRR | 0-63 | set/reset 1 bit into a register |
| | SET8 | 100HRRRRVVVVVVVV | 0-15 | set an 8 bit value on a registers |
| | MOVE8 | 0110HHRRRRRRRRRR | 0-31 | move content of a 8 bit register into another |
| | MOVE16 | 0100RRRRRRRRRRRR | 0-63 | move content of a 16 bit register into another |
| | ACC8 | 00001100WERRRRRR | 0-63 | move accumulator content to/from a 8 bit register |
| | RST8 | 000001100ERRRRRR | 0-63 | reset an 8 bit register |
| | RST16 | 0000001010RRRRRR | 0-63 | reset a 16 bit register |
| | CHK1 | 000110HHHHRRRRRR | 0-63 | check 1 bit |
| | CHK8 | 00001101XHRRRRRR | 0-63 | check 8 bit (zero/not zero) |
| | CHK16 | 000001111XRRRRRR | 0-63 | check 16 bit (zero/not zero) |
| | | *-ALU operations* | | |
| 406 | INCR8 | 000001101HRRRRRR | 0-63 | increment 8 bit register |
| | DECR8 | 000000110HRRRRRR | 0-63 | decrement 8 bit register |
| | INCR16 | 0000001011RRRRRR | 0-63 | increment 16 bit register |
| | DECR16 | 0000001001RRRRRR | 0-63 | decrement 16 bit register |
| | OPR8 | 101YYYHRRRRHRRRR | 0-15 | ALU operation on 8 bit register |
| | OPR16 | 000111YYRRRRRRRR | 0-15 | ALU operation on 16 bit register |
| | OPV_ACC | 0111YYYYVVVVVVVV | | ALU operation between accumulator and 16 bit value |
| | OPR_ACC8 | 001100YYYYHRRRRR | 0-31 | ALU operation between accumulator and 8 bit register |
| | OPR_ACC16 | 001101YYYYRRRRRR | 0-63 | ALU operation between accumulator and 16 bit register |
| | | *-Peripherals* | | |
| 408 | LOAD | 111HRRRRTTTTTTTT | 0-15 | load trim value from SRAM |
| | STORE_ACC | 00000100TTTTTTTT | | store accumulator in trim SRAM |
| | AUX8 | 00101HHUUUUURRRR | 0-15 | get 8 bit value from input channel |
| | AUX16 | 0000111UUUUURRRR | 0-15 | get 16 bit value from input channel |
| | CHK1_AUX | 0000100UUUUUHHHH | 0-15 | check 1 bit from input channel |
| | SETCR_REG | 110HRRRRCCCCCCCC | 0-15 | set a control register |
| | MASK | 00000000100XXXXB | | mask/unmask interrupt |
| | CONTEXT | 00000000101XXXZZ | | change instruction context |
| | INTR  420 | 000001110XRRRRRR | 0-63 | call interrupt routine |
| | SP_RESET | 0000000001XXXXXX | | reset stack pointer |
| | | CONTEXT 1 | | |
| 410 | SETCR | CCCCCCCCVVVVVVVV | | set a control register |
| | WAIT | 11111101VVVVVVVV | | wait for a fixed value |
| | WAITF  422 | 11111110TTTTTTTT | | wait for a parameterized value |
| | EXIT_CTXT | 11111111XXXXXXXB | | exit from context |
| | | CONTEXT 2 | | |
| | SETCR_TRIM | CCCCCCCCTTTTTTTT | | set a control register with value of a trim |
| | EXIT_CTXT | 11111111XXXXXXXB | | exit from current context |

FIG. 4 symbols 

| Symbol | Meaning |
|---|---|
| X | BIT DON'T CARE |
| A | JUMP ADDRESS |
| B | SELECTOR 1/0 (MASK/UNMASK,SET 1 OR SET 0) |
| R | INTERNAL REGISTER ADDRESS |
| V | NUMERICAL VALUE, DATA |
| T | TRIM ADDRESS |
| C | CONTROL REGISTER ADDRESS |
| U | AUXILIARY/ ASYNCHRONOUS INPUT ADDRESS |
| H | SUB-ADDRESS (HIGHER/LOWER BYTE INTO WORD) |
| Y | ALU OPERATOR CODE |
| Z | CONTEXT SWITCH |
| N | NEGATE CONDITION |
| M | SELECT PROCEDURE VS. MACRO CALL |
| W | SELECT READ/WRITE OPERATION ON ACCUMULATOR |

FIG. 5

MEMORY CONTROLLERS

TECHNICAL FIELD

The present embodiments relate generally to memory controllers and a particular embodiment relates to single machine controllers.

BACKGROUND

Memory devices (which are sometimes referred to herein as "memories") are typically provided as internal, semiconductor, integrated circuits in computers or other electronic systems. There are many different types of memory including random-access memory (RAM), read only memory (ROM), dynamic random access memory (DRAM), synchronous dynamic random access memory (SDRAM), and flash memory.

Flash memory devices have developed into a popular source of non-volatile memory for a wide range of electronic applications. Flash memory devices typically use a one-transistor memory cell that allows for high memory densities, high reliability, and low power consumption. Changes in threshold voltage of the cells, through programming of a charge storage structure, such as floating gates or trapping layers or other physical phenomena, determine the data state of each cell. Common electronic systems that utilize flash memory devices include, but are not limited to, personal computers, personal digital assistants (PDAs), digital cameras, digital media players, digital recorders, games, appliances, vehicles, wireless devices, cellular telephones, and removable memory modules, and the uses for flash memory continue to expand.

Flash memory typically utilizes one of two basic architectures known as NOR flash and NAND flash. The designation is derived from the logic used to read the devices. In NOR flash architecture, a string of memory cells is coupled in parallel with each memory cell coupled to a data line, such as those typically referred to as digit (e.g., bit) lines. In NAND flash architecture, a string of memory cells is coupled in series with only the first memory cell of the string coupled to a bit line.

As the performance and complexity of electronic systems increase, the requirement for additional memory in a system also increases. However, in order to continue to reduce the costs of the system, the parts count must be kept to a minimum. This can be accomplished by increasing the memory density of an integrated circuit by using such technologies as multilevel cells (MLC). For example, MLC NAND flash memory is a very cost effective non-volatile memory.

A prior art double machine controller 100 is shown in FIG. 1. The controller 100 has a controller 102 for conventional control flow instructions (e.g., greater than 16 bit instructions), and a controller 104 for conventional macro-sequencer instructions (e.g., 16 bit instructions). Referring also to FIG. 2, prior art general purpose flow instructions are shown at 202, and prior art macro-sequencer instructions are shown at 204. Flow control instructions are conventional. Each instruction has an operational-code (op-code) that identifies an instruction and some argument. This allows flow control instructions including jumps, calls, return operation and conventional register-to register data moves or arithmetical operators. Macro-sequencer instructions (referred to macro-sequencer) are not conventional instructions. Instead, macro-sequencer instructions are referred to as "no-opcode" or "zero-code" instruction sets, in the sense that each instruction of a macro-sequencer instruction set is couple of address and data. "No op-code" allows just value-to-register instruction and delay. No control flow is allowed in macro-sequencer instruction sets.

A separate macro-sequencer controller 104 is used because it is more compact in terms of a total size of program instructions (e.g., silicon area on a PROM). 16 bit instructions are not used for control flow instructions because the control registers 106 spaced about a die are written as couples of 8 bits comprising an address, and 8 bits of data, for example the sequence of register write operations 204 shown in FIG. 2. Therefore, a 16 bit sequencer is not suitable for general purpose instructions that often exceed 16 bits, and are not in the proper format for a 16 bit sequencer, for example the if else instruction 202 shown in FIG. 2.

Memories typically operate internally using a plurality of registers such as registers 106 for buffering instructions to be executed on the memory array. A control process, operated by a controller 100, is often used to control memory operations. These operations are usually called algorithms by people skilled in the art. Typical registers have 16 bits, and use 8 bits for data and 8 bits for an address. A macro is defined as a sequence of 16 bit words. Controller instruction sets typically contain different types of instructions. These instructions may be broken into two sets of instructions, a first control flow set of instructions (executed at 102), and a second macro sequencer set of instructions (executed at 104). An instruction set that controls execution flow (102) is often larger than 16 bits, so macros are executed by a dedicated 16 bit machine often referred to as a macro sequencer (104). The controller calls macros for execution through a master/slave protocol (108). The double machine architecture occupies valuable die space on an integrated circuit.

Control flow instruction sets can be complicated, using, for example, nested commands and the like. Coding for control flow instruction sets especially results in fragmented microcode. Typical macro sequencers are limited in operation. For example, conditional branching is not done in current macro sequencers. For the reasons stated above and for other reasons that will become apparent to those skilled in the art upon reading and understanding the present specification, there is a need in the art for merging the two instruction sets and providing a single machine controller.

BRIEF DESCRIPTION OF THE DRAWINGS

FIG. 4 is a diagram showing an embodiment of an instruction set of the present disclosure;

FIG. 5 is a diagram showing symbols used in the embodiment of FIG. 4;

DETAILED DESCRIPTION

Figure 1:
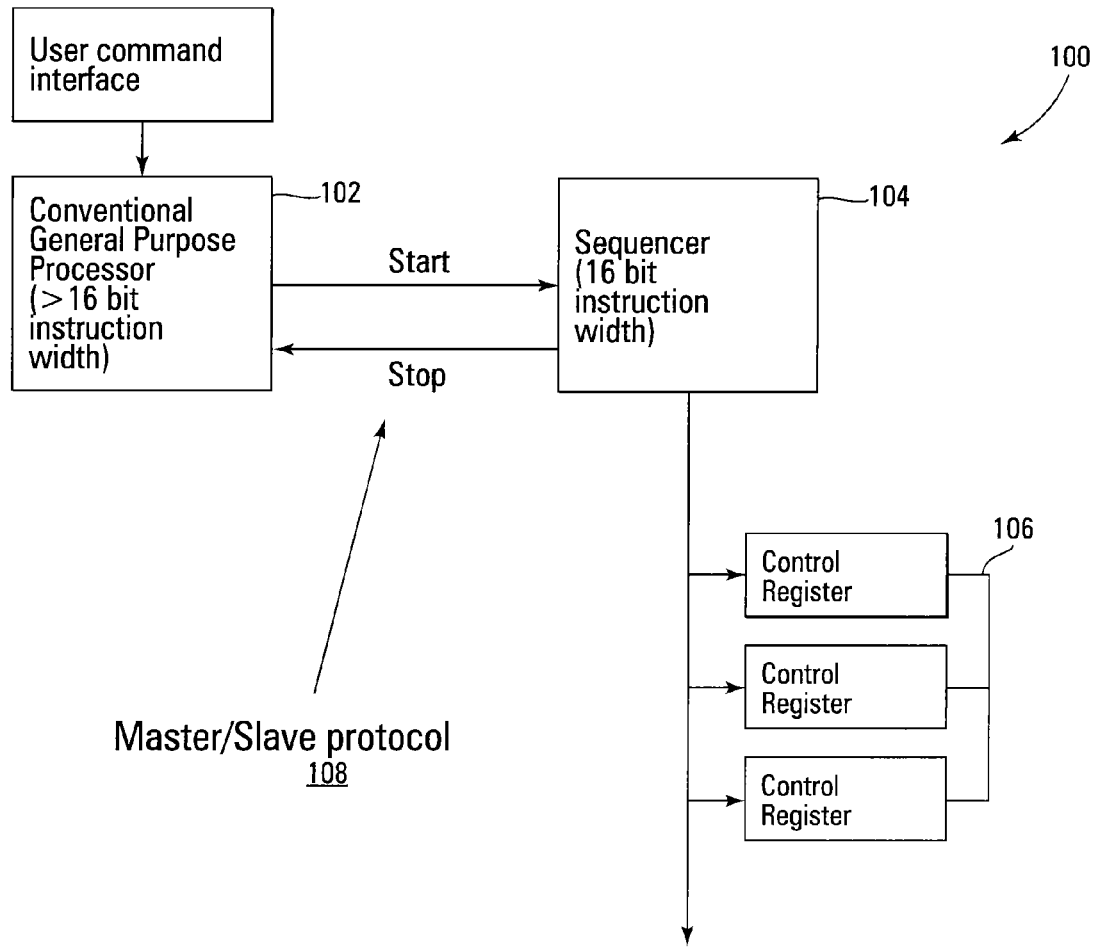
FIG. 1 is a block diagram of a prior art double machine controller.
Figure 2:
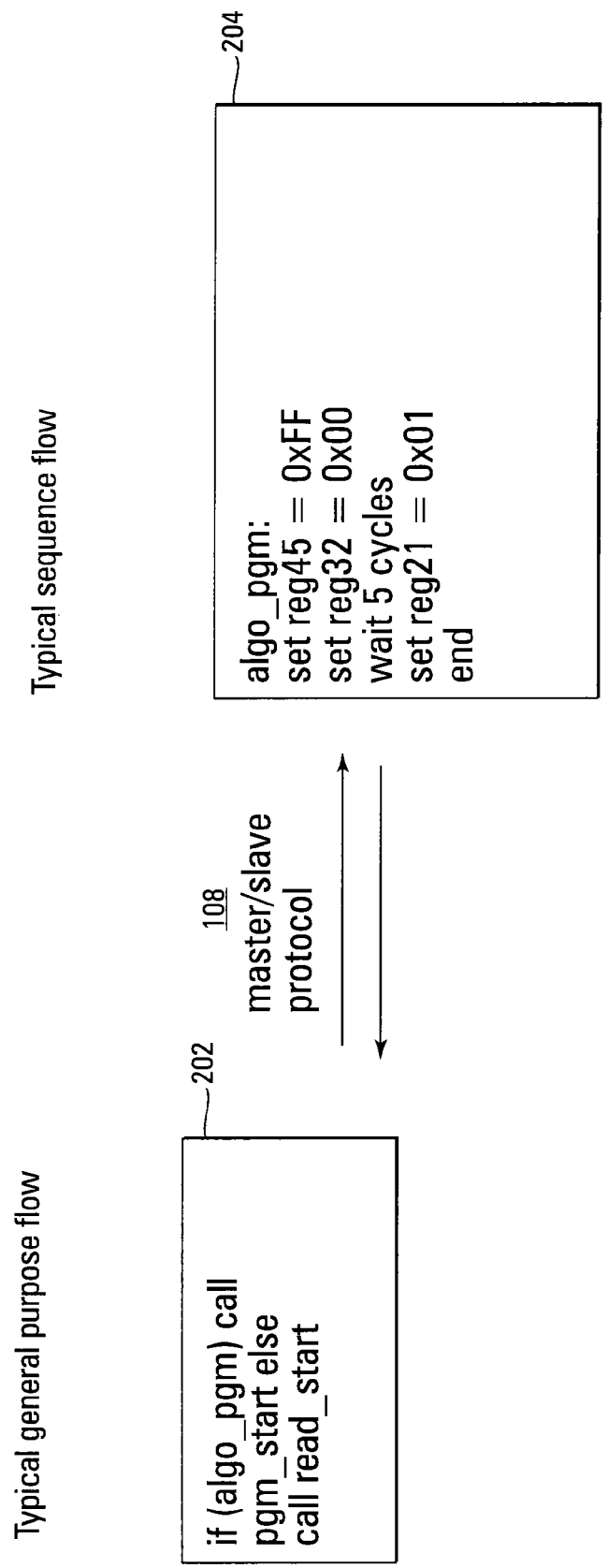
FIG. 2 is a block diagram of conventional control flow instructions and conventional macro-sequencer instructions.

In the following detailed description, reference is made to the accompanying drawings that form a part hereof and in which is shown, by way of illustration, specific embodiments. In the drawings, like numerals describe substantially similar components throughout the several views. Other embodiments may be utilized and structural, logical, and electrical changes may be made without departing from the scope of the present disclosure. The following detailed description is, therefore, not to be taken in a limiting sense.

Embodiments of the present disclosure use a single machine controller having an architecture that allows the controller to execute separate types of instructions (e.g., control flow instructions and macro flow instructions) in a single instruction set. The machine in one embodiment is contained within a control unit. In another embodiment, it can be a compiler, which is a software tool that is used by a programmer to hide implementation details of an instruction set, but writing microcode at an higher level of abstraction. The compiler is used to put in the microcode context switch instructions, so that programmer does not have to. The control unit executes sequences in a way that is hidden to a programmer of instruction sets that are to be run. When code is written with two instruction sets, the control unit can swap between the instruction sets while maintaining a conventional microcode architecture. In this way, a programmer may continue to write code at an instruction set level with normal execution flow instructions and macro sequencer instructions. The instructions are executed by the single machine. The mode to use for the instruction set is determined in one embodiment at the controller level. This reduces the amount of registers on the integrated circuit, freeing valuable die space.

Figure 3:
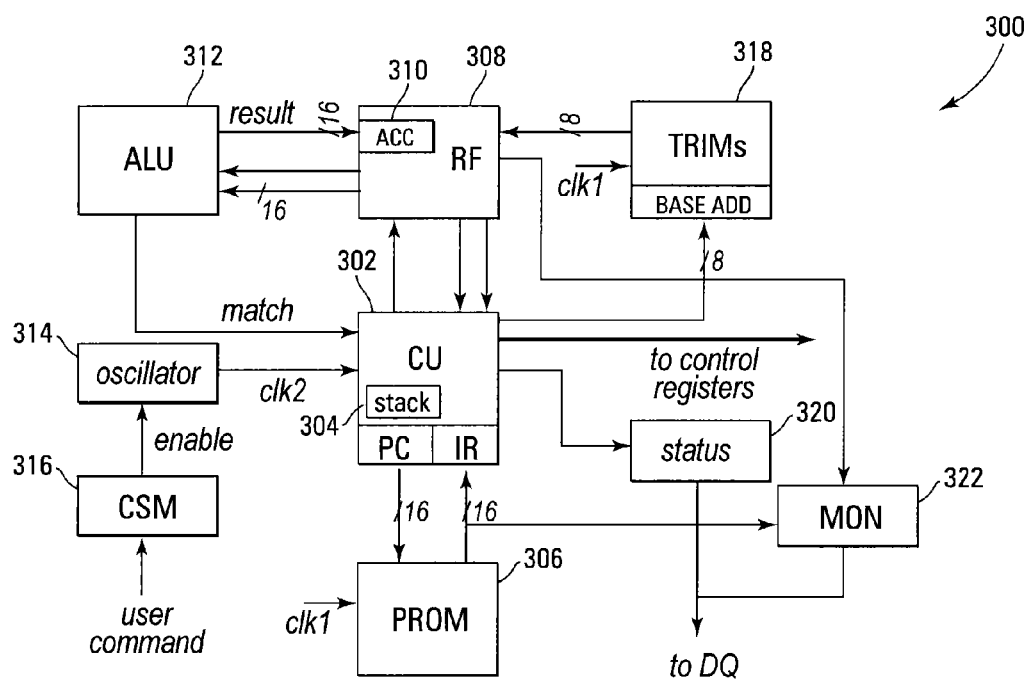
FIG. 3 is a block diagram of a single machine controller architecture according to an embodiment of the present disclosure.

A controller architecture 300 on which embodiments of the present disclosure may be practiced is shown in FIG. 3. Controller 300 comprises a control unit (CU) 302 that performs an instruction fetch-execution cycle. A stack 304 in CU 302 is used to take into account procedure calls. In one embodiment, the stack has a depth of 16 words, therefore 16 nested calls are possible. The stack 304 returns addresses from procedures and is not concerned with local variable storage. CU 302 is supported by instruction programmable read only memory (PROM) 306 and register file (RF) 308. Accumulator (ACC) 310 is in one embodiment a special register within register file 308, at address 0. The arithmetic logic unit (ALU) 312 performs integer arithmetic and logic operations. An internal oscillator (OSC) 314 is driven by a command state-machine (CSM) 316. The CSM decodes user/test commands and starts algorithms based on those commands. In one embodiment, a volatile memory bank 318 is used to store trim values. Memory bank 318 may be an SRAM, a bank of registers, or a number of spare registers. CU 302 is connected to status registers 320 that allow user applications to obtain status data concerning running operations, and to monitor circuit (MON) 322 that enables external tester access to internal variables, signals, busses, and the like during prototyping or engineering phases.

The controller 300 has operative code length which is variable to fit all possible instructions into a single 16 bit instruction set. One example of an instruction set 400 is shown in FIG. 4. Instruction set 400 includes dedicated instructions for register resets, and check-with-zero instructions to reduce operand length. Jumps are allowed into a 512 byte page. Jumps longer than a page are executed by a dedicated instruction setting an upper part of an address. In one embodiment, internal registers are divided into privileged areas to reduce operand length. Multiple trim loads may be stored in memory bank 318. The accumulator 310 combined with ALU 312 allows arithmetic functions to also reduce operand length. It should be understood that the instruction set 400 is one example of an instruction set, and that using the constructs of the instruction set allows for additional instructions or a reduced instruction set without departing from the scope of the disclosure.

Referring now also to FIG. 4, a single 16 bit instruction set 400 is shown. Instruction set 400 includes portions for flow control 402, register operations 404, ALU operations 406, peripherals 408, and context operations 410. A context switch instruction 420 changes the instruction context from control flow to macro flow. Upon completion of macro flow, an exit context instruction 422 changes the instruction context back to control flow. In one embodiment, execution of a context switch instruction, either instruction 420 or instruction 422, uses a single instruction cycle.

Symbols used in interpreting the example instruction set 400 are shown in FIG. 5.

Code is written to read only memory (ROM). The code comprises in one embodiment a control flow-type instructions set and a macro-type instruction set. When an instruction is written to a register for execution, the context of the instruction is determined by the control unit 302. The control unit 302 sends a context control signal to the register and executes an appropriate mode of operation, either a control-flow mode or a macro-flow mode of operation. The present disclosure uses a single 16 bit register to execute a single 16 bit instruction set that contains both control flow and macro flow instructions. A context switch instruction prompts a switch from control flow to macro flow, and an exit from context instruction prompts a switch from macro flow to control flow, all within the same single machine controller and the same single 16 bit instruction set.

Figure 6:
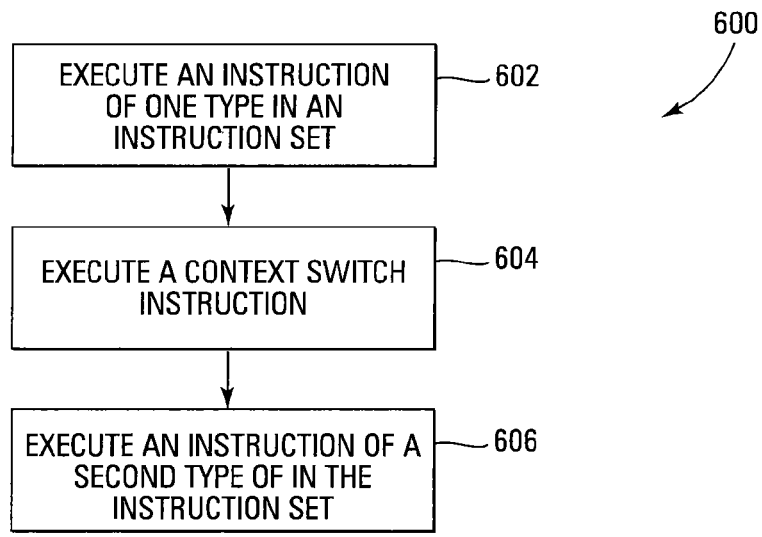
FIG. 6 is a flow chart diagram of a method according to an embodiment of the present disclosure.

A method 600 for executing a single instruction set containing both control flow instructions and macro flow instructions is shown in flow chart form in FIG. 6. Method 600 comprises, in one embodiment, executing an instruction of one type in an instruction set in block 602, executing a context switch instruction in block 604, and executing an instruction of a second type in the instruction set in block 606. Executing an instruction of one type in an instruction set comprises, in one embodiment, executing instructions having an operational code, in one embodiment control flow instructions, in a controller. Executing a context switch instruction comprises, in one embodiment, executing in the controller. Executing an instruction of a second type in the instruction set comprises, in one embodiment, executing instructions that do not have an operation code, in one embodiment macro flow instructions, in the controller. Upon completion of execution of instructions of the second type, another method executes an exit from context instruction that allows executing instructions of the one type again. In another embodiment, the single instruction set is a 16 bit instruction set, and the controller is a 16 bit machine.

Control flow instructions include instructions that operate in global execution flow, including but not limited to calls for external routines, nested if statements, and more complex programming. Macro flow instructions are used for macro sequencing that was previously performed by macro registers in multiple locations on a die and controlled by a microprocessor. The macro flow instructions include, for example, register setting, resetting, waiting, and macro execution.

In one embodiment, the controller switches modes from one mode to the other on receipt of a context switch instruction. As described above, the context instruction may be part of an instruction set. Alternatively, the controller may be programmed to recognize the context in which a single instruction set is to be run, and automatically switch when a different context (e.g., control flow versus macro flow, or macro flow versus control flow) is to be used. In one embodiment, this is accomplished by a one or more bit instruction embedded in the first instruction set at the point at which the context is to be switched. In another embodiment, this is accomplished by the controller being programmed to recognize a pattern indicating that an instruction should be run in the other mode from what is currently being run. For example, one instance of a pattern indicating that an instruction should be run in a macro flow mode is when a register write command is given, as register writes are traditionally a macro flow operation. One instance of a pattern indication that an instruction should be run in a control flow is the end of a register write sequence not followed by another register write sequence. It should be understood that the instructions that trigger a context switch or an exit from context switch may vary, or that a controller may be programmed to recognize other context switch instructions or triggers without departing from the scope of the disclosure.

Figure 7:
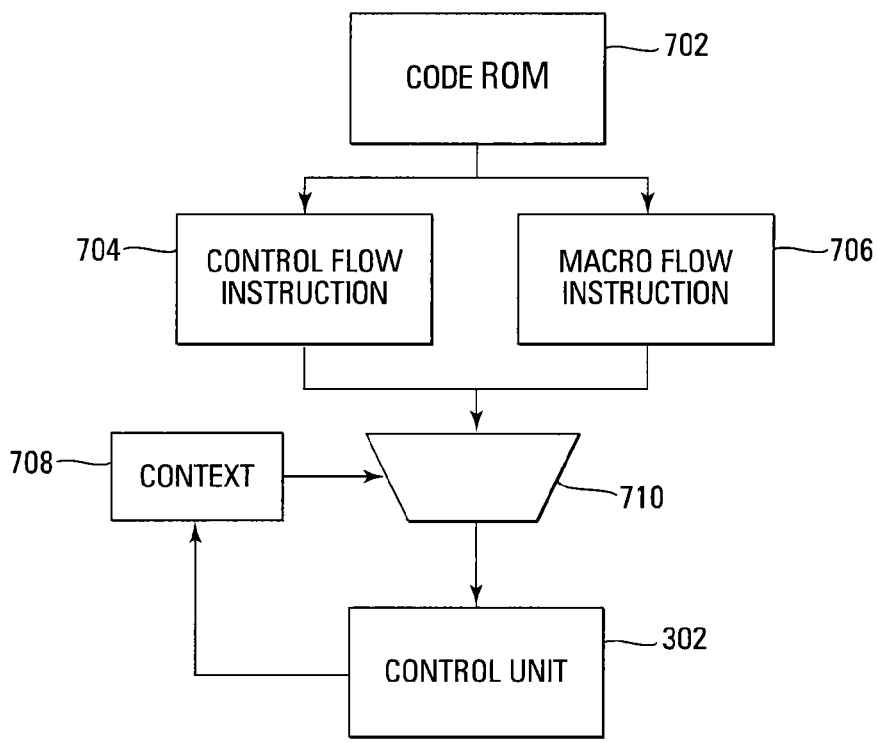
FIG. 7 is a block operation diagram showing generally operation of methods and controllers of the present disclosure.

A block operation diagram showing generally operation of the methods and controller is shown in FIG. 7. Read only memory (ROM) code is stored at 702. The ROM code comprises instructions in a single 16 bit instruction set such as set 400 that are interpreted either as control flow instructions 704 or macro flow instructions 706. Control unit 302 controls the context indicator 708 that indicates to operation machine 710 the context for operation of the instruction set. Machine 710 in one embodiment is a part of control unit 302 and includes a 16 bit register for buffering instructions from control flow instruction set 704 or macro flow instruction set 706 for operation in the determined context within control unit 302.

Figure 8:
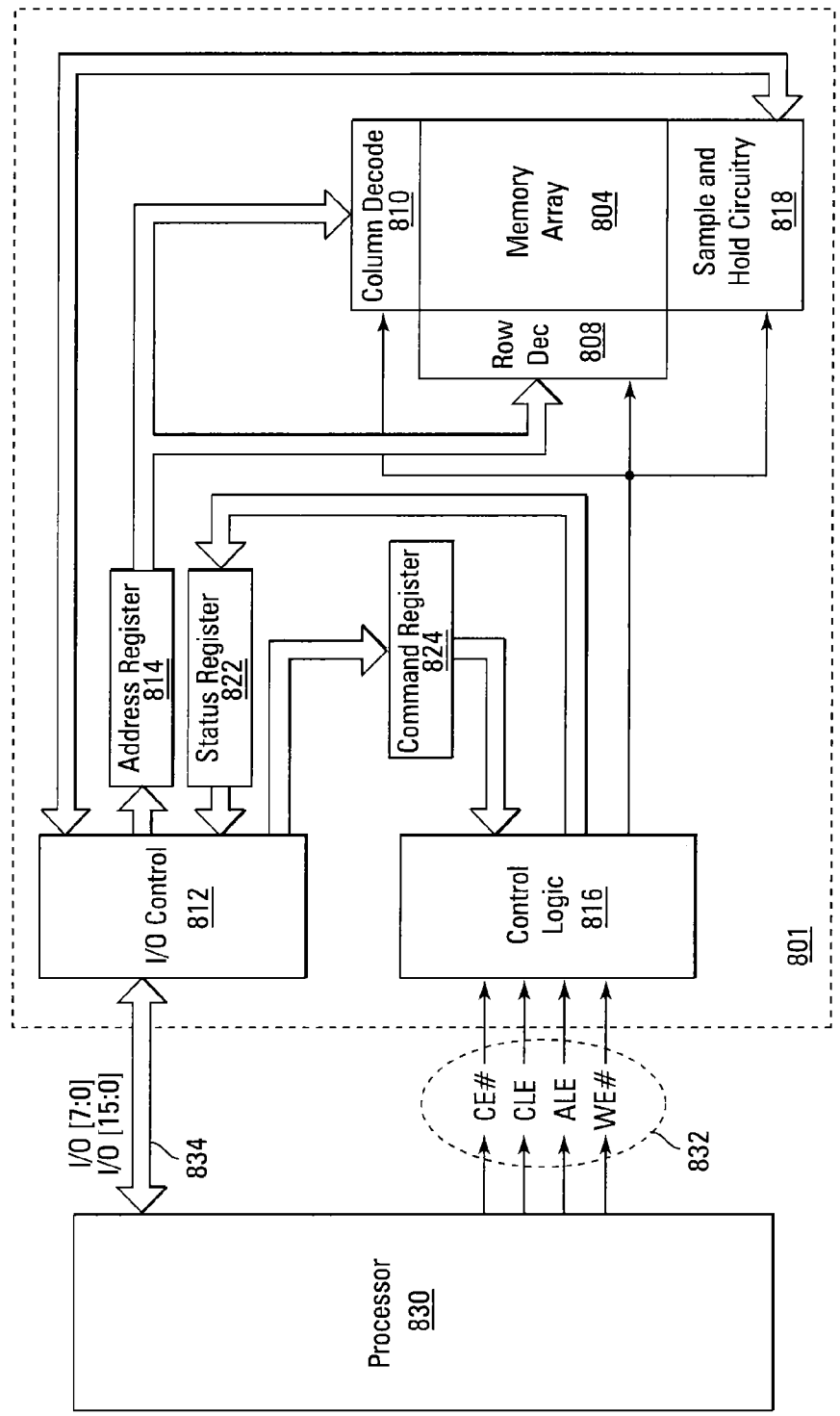
FIG. 8 is a block schematic of an electronic system in accordance with an embodiment of the disclosure.

The controller 300, while suitable for use in many integrated circuits and for many different instruction sets, may, in one embodiment, be part of a flash memory device as shown in FIG. 8. FIG. 8 is a simplified block diagram of a memory device 801 according to an embodiment of the disclosure, and on which various embodiments of the disclosure can be practiced. Memory device 801 includes an array of memory cells 804 arranged in rows and columns. Although the various embodiments will be described primarily with reference to NAND memory arrays, the various embodiments are not limited to a specific architecture of the memory array 804. Some examples of other array architectures suitable for the present embodiments include NOR arrays, AND arrays, and virtual ground arrays. Further, the embodiments described herein are amenable for use with SLC and MLC memories without departing from the scope of the disclosure. Also, the methods are applicable for memories which could be read/sensed in analog format.

Row decode circuitry 808 and column decode circuitry 810 are provided to decode address signals provided to the memory device 801. Address signals are received and decoded to access memory array 804. Memory device 801 also includes input/output (I/O) control circuitry 812 to manage input of commands, addresses and data to the memory device 801 as well as output of data and status information from the memory device 801. An address register 814 is coupled between I/O control circuitry 812 and row decode circuitry 808 and column decode circuitry 810 to latch the address signals prior to decoding. A command register 824 is coupled between I/O control circuitry 812 and control logic 816 (which may include the elements and code of controller 300) to latch incoming commands. In one embodiment, control logic 816, control circuitry 812 and/or firmware or other circuitry can individually, in combination, or in combination with other elements, form an internal controller. As used herein, however, a controller need not necessarily include any or all of such components. In some embodiments, a controller can comprise an internal controller (e.g., located on the same die as the memory array) and/or an external controller. Control logic 816 controls access to the memory array 804 in response to the commands and generates status information for an external controller such as a processor 830. The control logic 816 is coupled to row decode circuitry 808 and column decode circuitry 810 to control the row decode circuitry 808 and column decode circuitry 810 in response to the addresses.

A status register 822 is coupled between I/O control circuitry 812 and control logic 816 to latch the status information for output to an external controller.

Memory device 801 receives control signals at control logic 816 over a control link 832. The control signals may include a chip enable CE#, a command latch enable CLE, an address latch enable ALE, and a write enable WE#. Memory device 801 may receive commands (in the form of command signals), addresses (in the form of address signals), and data (in the form of data signals) from an external controller over a multiplexed input/output (I/O) bus 834 and output data to an external controller over I/O bus 834.

In a specific example, commands are received over input/output (I/O) pins [7:0] of I/O bus 834 at I/O control circuitry 712 and are written into command register 824. The addresses are received over input/output (I/O) pins [7:0] of bus 834 at I/O control circuitry 812 and are written into address register 814. The data may be received over input/output (I/O) pins [7:0] for a device capable of receiving eight parallel signals, or input/output (I/O) pins [15:0] for a device capable of receiving sixteen parallel signals, at I/O control circuitry 812 and are transferred to sample and hold circuitry 818. Data also may be output over input/output (I/O) pins [7:0] for a device capable of transmitting eight parallel signals or input/output (I/O) pins [15:0] for a device capable of transmitting sixteen parallel signals. It will be appreciated by those skilled in the art that additional circuitry and signals can be provided, and that the memory device of FIG. 8 has been simplified to help focus on the embodiments of the disclosure.

Methods for executing an instruction set may be performed in various embodiments on a memory such as memory 801. Such methods are shown and described herein with reference to FIGS. 3-7.

Additionally, while the memory device of FIG. 8 has been described in accordance with popular conventions for receipt and output of the various signals, it is noted that the various embodiments are not limited by the specific signals and I/O configurations described. For example, command and address signals could be received at inputs separate from those receiving the data signals, or data signals could be transmitted serially over a single I/O line of I/O bus 834. Because the data signals represent bit patterns instead of individual bits, serial communication of an 8-bit data signal could be as efficient as parallel communication of eight signals representing individual bits.

CONCLUSION

In summary, one or more embodiments of a controller, instruction set, and methods for executing instruction sets are shown. The controller may include, in one or more embodiments, a single machine executing instructions in an instruction set with instructions having an operational code, and instructions that do not have an operational code. In one or more embodiments, methods include executing an instruction of one type in an instruction set, executing a context switch instruction, and executing an instruction of a second type in the instruction set.

Although specific embodiments have been illustrated and described herein, it will be appreciated by those of ordinary skill in the art that any arrangement that is calculated to achieve the same purpose may be substituted for the specific embodiments shown. Many adaptations of the disclosure will be apparent to those of ordinary skill in the art. Accordingly, this application is intended to cover any adaptations or variations of the disclosure.

What is claimed is:

1. A method of executing an instruction set, comprising:
   executing, in a controller using a first mode of interpreting portions of an instruction, an instruction of one type in the instruction set, wherein each instruction of the instruction set has a same length;
   executing, in the controller, a context switch instruction to change a mode of operation of the controller to use a second, different, mode of interpreting portions of an instruction after executing the instruction of the one type; and
   executing, in the controller using the second mode of interpreting portions of an instruction, an instruction of a second, different, type in the instruction set only after executing the context switch instruction;
   wherein the context switch instruction is an instruction of the instruction set.

2. The method of claim 1, wherein executing instructions of the one type in the instruction set comprises executing instructions having an operational code.

3. The method of claim 1, wherein executing instructions of the second type in the instruction set comprises executing instructions that do not have an operational code.

4. The method of claim 1, wherein executing an instruction of the one type in the instruction set comprises executing control flow instructions in the controller.

5. The method of claim 1, wherein executing an instruction of the second type in the instruction set comprises executing control flow instructions in the controller.

6. The method of claim 1, and further comprising:
   executing, in the controller, an exit from context instruction to change the mode of operation of the controller to a prior mode of operation used to execute the instruction of the one type in the instruction set using the first mode of interpreting portions of an instruction;
   wherein the exit from context instruction is an instruction of the instruction set.

7. The method of claim 1, wherein instructions of the instruction set are executed on a 16 bit controller.

8. The method of claim 1, wherein instructions of the instruction set comprise 16 bit instructions.

9. A method for executing an instruction set, comprising:
   running a first portion of the instruction set using a first mode of operation of a controller, wherein running the first portion of the instruction set comprises executing the first portion of the instruction set in the controller using the first mode of operation;
   running a second portion of the instruction set using a second mode of operation of the controller, wherein running the second portion of the instruction set comprises executing the second portion of the instruction set in the controller using the second mode of operation;
   determining whether a subsequent instruction to be executed in the controller belongs to a different one of the first and second portions of the instruction set than a prior instruction executed in the controller; and
   when it is determined that the subsequent instruction belongs to a different one of the first and second portions of the instruction set than the prior instruction, changing the mode of operation of the controller prior to executing the subsequent instruction;
   wherein the controller is a single machine controller; and
   wherein each instruction of the instruction set has a same length.

10. The method of claim 9, and further comprising:
    switching modes upon receipt of a context instruction as part of the first portion of the instruction set.

11. The method of claim 9, wherein the first mode is an execution flow control mode.

12. The method of claim 9, wherein the second mode is a macro sequencer mode.

13. The method of claim 9, wherein the second mode of the controller is started when a macro call is made in a first portion of the instruction set.

14. The method of claim 13, wherein the first mode of the controller is restarted at completion of the macro code.

15. The method of claim 10, and further comprising changing back to the first mode on receipt of an exit from context instruction.

16. A controller, comprising:
    a read only memory for storing instructions comprising an instruction set, wherein each instruction of the instruction set has a same length;
    a register to load instructions of the instruction set therein; and
    a control unit to execute instructions of the instruction set loaded into the register, the control unit configured to switch between execution of instructions of one type using a first execution mode with a first mode of interpreting instructions and execution of instructions of another type using a second execution mode with a different mode of interpreting instructions upon receipt of a context switch instruction of the instruction set that is solely designated to change the execution mode of the control unit.

17. The controller of claim 16, wherein the control unit executes the first execution mode as an execution flow control mode.

18. The controller of claim 16, wherein the control unit executes the second execution mode as a macro sequencer mode.

19. The controller of claim 16, wherein the control unit is further configured to start the second mode of the controller when a macro call is made in the first instruction set.

20. The controller of claim 19, wherein the control unit is further configured to restart the first mode upon receipt of an exit from context instruction.

21. The compiler of claim 16, wherein the register is a 16-bit register.

22. A memory device, comprising:
    an array of memory cells;
    a controller, comprising:

a single machine, wherein the single machine is configured to execute instructions in a first instruction set and instructions in a second instruction set, wherein the single machine is further configured to use a first mode of interpreting instructions in the first instruction set and to use a different mode of interpreting instructions of the second instruction set, wherein the first instruction set comprises instructions having an operational code, and the second instruction set comprises instructions that do not have an operational code, and wherein instructions of the first instruction set each have a particular length and instructions of the second instruction set each have the particular length.

23. A controller, comprising:
a control unit; and
an instruction set, the instruction set comprising an instruction only configured to cause the control unit to switch a context of executing instructions of the instruction set of a first type using a first mode of interpreting instructions to executing instructions of the instruction set of a second type different than the first type using a different mode of interpreting instructions.

24. The controller of claim 23, wherein the control unit has a configuration to perform a method, the method comprising:
executing an instruction of the instruction set of the first type using the first mode of interpreting instructions;
executing the context switch instruction; and
executing an instruction of a second type in the instruction set the instruction set of the second type using the different mode of interpreting instructions.

25. A controller comprising:
a single machine controller, wherein the single machine controller is configured to interpret and execute instructions of a first instruction type and interpret and execute instructions of a second instruction type different than the first instruction type, wherein the single machine controller is further configured to interpret an instruction of the first instruction type having a particular value to be a different instruction than an instruction of the second instruction type having the particular value, wherein the first instruction type comprises instructions having an operational code, wherein the second instruction type comprises instructions that do not have an operational code, and wherein instructions of the first instruction type and instructions of the second instruction type have a same length.

26. The method of claim 1, wherein using the first mode of interpreting portions of an instruction comprises determining that a first instruction having a particular value is an instruction to perform a particular action, and wherein using the second mode of interpreting portions of an instruction comprises determining that a second instruction having the particular value is an instruction to perform a different action.

27. The method of claim 1, further comprising:
executing, in the controller, a second context switch instruction to change the mode of operation of the controller to use an additional mode of interpreting portions of an instruction that is different from the first and second modes of interpreting portions of an instruction; and
executing, in the controller using the additional mode of interpreting portions of an instruction, an instruction of a third type in the instruction set, different from the first and second types in the instruction set, only after executing the second context switch instruction;
wherein the second context switch instruction is an instruction of the instruction set.

* * * * *

UNITED STATES PATENT AND TRADEMARK OFFICE
CERTIFICATE OF CORRECTION

| | |
|---|---|
| PATENT NO. | : 9,513,912 B2 |
| APPLICATION NO. | : 13/560279 |
| DATED | : December 6, 2016 |
| INVENTOR(S) | : De Santis et al. |

It is certified that error appears in the above-identified patent and that said Letters Patent is hereby corrected as shown below:

In the Claims

Column 9, Line 29, Claim 24 delete "instruction of a second type in the instruction set the instruction set" and insert in place thereof --instruction of the instruction set--.

Signed and Sealed this
Fourth Day of April, 2017

Michelle K. Lee
*Director of the United States Patent and Trademark Office*